US009898867B2

(12) United States Patent
Bare et al.

(10) Patent No.: US 9,898,867 B2
(45) Date of Patent: Feb. 20, 2018

(54) SYSTEM AND METHOD FOR AUGMENTED REALITY DISPLAY OF HOISTING AND RIGGING INFORMATION

(71) Applicant: Huntington Ingalls Incorporated, Newport News, VA (US)

(72) Inventors: Brian Bare, Newport News, VA (US); Jonathan Martin, Newport News, VA (US); Patrick Ryan, Newport News, VA (US); Paul Sells, Los Angeles, CA (US); Mark Lawrence, Newport News, VA (US)

(73) Assignee: Huntington Ingalls Incorporated, Newport News, VA (US)

( * ) Notice: Subject to any disclaimer, the term of this patent is extended or adjusted under 35 U.S.C. 154(b) by 0 days.

(21) Appl. No.: 14/800,049

(22) Filed: Jul. 15, 2015

(65) Prior Publication Data
US 2016/0019721 A1    Jan. 21, 2016

Related U.S. Application Data

(60) Provisional application No. 62/025,041, filed on Jul. 16, 2014, provisional application No. 62/036,762, filed on Aug. 13, 2014.

(51) Int. Cl.
*G09G 5/00* (2006.01)
*G06T 19/00* (2011.01)
*G01S 5/16* (2006.01)

(52) U.S. Cl.
CPC ............ *G06T 19/006* (2013.01); *G01S 5/163* (2013.01)

(58) Field of Classification Search
None
See application file for complete search history.

(56) References Cited

U.S. PATENT DOCUMENTS 4,863,268 A    9/1989 Clarke
7,852,355 B2 *  12/2010 Friedrich ............... G06F 3/012
                                               345/632
(Continued)

FOREIGN PATENT DOCUMENTS

WO    WO 2013/023705    2/2013
WO    WO 2013/049248    4/2013
WO    WO 2014/015378    1/2014

OTHER PUBLICATIONS

Hammad, "Distributed Augmented Reality for Visualising Collaborative Construction Tasks", Journal of computing in civil engineering, No. 6, Oct. 15, 2009, pp. 171-183.*

(Continued)

*Primary Examiner* — M Good Johnson
(74) *Attorney, Agent, or Firm* — Hunton & Williams LLP

(57) ABSTRACT

A method for providing information associated with a lift process to a mobile device user is presented. The method comprises receiving a request for lift environment information from a mobile device, determining a pose of the mobile interface device relative to a lift process target area, and obtaining lift environment information for at least a portion of the lift process target area. The lift environment information is used to assemble AR lift information for transmission to and display on the mobile interface device. The AR lift information is configured for viewing in conjunction with a real-time view of the lift process target area captured by the mobile interface device. The AR lift information is then transmitted to the mobile interface device for display.

18 Claims, 6 Drawing Sheets

(56) References Cited

U.S. PATENT DOCUMENTS

| | | |
|---|---|---|
| 8,248,467 B1 | 8/2012 | Ganick et al. |
| 8,542,906 B1 | 9/2013 | Persson et al. |
| 9,170,766 B2* | 10/2015 | Meier .................. G02B 27/017 |
| 2002/0075451 A1 | 6/2002 | Ruiz |
| 2002/0191004 A1 | 12/2002 | Ebersole |
| 2003/0210228 A1 | 11/2003 | Ebersole |
| 2007/0050115 A1 | 3/2007 | Discenzo et al. |
| 2007/0081695 A1 | 4/2007 | Foxlin |
| 2007/0088526 A1 | 4/2007 | Friedrich et al. |
| 2009/0095086 A1 | 4/2009 | Kessler |
| 2009/0215471 A1 | 8/2009 | Sands |
| 2010/0190449 A1 | 7/2010 | Suzuki |
| 2010/0238161 A1 | 9/2010 | Varga |
| 2010/0321389 A1 | 12/2010 | Gay |
| 2011/0115816 A1 | 5/2011 | Brackney |
| 2011/0164163 A1 | 7/2011 | Bilbrey |
| 2011/0187744 A1 | 8/2011 | Kim et al. |
| 2011/0216090 A1 | 9/2011 | Woo et al. |
| 2011/0306412 A1 | 12/2011 | Ehara et al. |
| 2012/0001938 A1 | 1/2012 | Sandberg |
| 2012/0015730 A1 | 1/2012 | Watkins, Jr. |
| 2012/0098754 A1 | 4/2012 | Kim |
| 2012/0098859 A1 | 4/2012 | Lee et al. |
| 2012/0218263 A1* | 8/2012 | Meier .................. G06T 19/00 345/419 |
| 2013/0057581 A1* | 3/2013 | Meier .................. G02B 27/017 345/633 |
| 2013/0113827 A1 | 5/2013 | Forutanpour et al. |
| 2013/0113993 A1 | 5/2013 | Dagit, III |
| 2013/0136300 A1 | 5/2013 | Wagner et al. |
| 2013/0154824 A1 | 6/2013 | Cai |
| 2013/0162632 A1 | 6/2013 | Varga |
| 2013/0231779 A1 | 9/2013 | Purkayastha et al. |
| 2013/0253824 A1 | 9/2013 | Yang |
| 2013/0321245 A1 | 12/2013 | Harper |
| 2013/0342568 A1 | 12/2013 | Ambrus |
| 2014/0063055 A1 | 3/2014 | Osterhout |
| 2014/0071163 A1 | 3/2014 | Kinnebrew et al. |
| 2014/0111544 A1* | 4/2014 | Hammond .......... G06T 19/006 345/633 |
| 2014/0118397 A1 | 5/2014 | Lee et al. |
| 2014/0188333 A1 | 7/2014 | Friend |
| 2014/0267417 A1 | 9/2014 | Bare et al. |
| 2014/0280199 A1 | 9/2014 | Bare et al. |
| 2014/0282911 A1 | 9/2014 | Bare et al. |
| 2015/0029819 A1 | 1/2015 | Yacoubian |
| 2015/0042678 A1 | 2/2015 | Alt |
| 2015/0188984 A1* | 7/2015 | Mullins .................. H04L 67/04 709/219 |
| 2015/0283700 A1 | 10/2015 | Trautman |
| 2015/0294506 A1 | 10/2015 | Bare et al. |
| 2015/0310279 A1 | 10/2015 | Bare et al. |
| 2017/0132799 A1 | 5/2017 | Yajko |

OTHER PUBLICATIONS

Chen et al., "A Smart Crane Operations Assistance System Using Augmented Reality Technology", Proceedings of 28 Internation Symposium on Automation and Robotics in Construction, 2011, pp. 643-649.*

PCT International Search Report, International Application No. PCT/US15/040562, Oct. 15, 2015, pp. 1-2.

International Search Report of the International Searching Authority issued in PCT/US2015/044838, dated Nov. 12, 2015 (2 pages).

International Search Report of the International Searching Authority issued in PCT/US2015/025784, dated Jul. 20, 2015 (2 pages).

International Search Report of the International Searching Authority issued in PCT/US2015/033972, dated Aug. 21, 2015 (2 pages).

International Search Report of the International Searching Authority issued in PCT/US2015/025734, dated Jul. 30, 2015 (2 pages).

International Search Report of the International Searching Authority issued in PCT/US2015/051354, dated Dec. 11, 2015 (2 pages).

Yacoubian, U.S. Appl. No. 61/857,391 of 2015/0029819, filed Jul. 23, 2013, pp. 1-27.

Yajko, U.S. Appl. No. 61/951,603 of 2017/0132799, filed Mar. 12, 2014, pp. 1-46.

* cited by examiner

SYSTEM AND METHOD FOR AUGMENTED REALITY DISPLAY OF HOISTING AND RIGGING INFORMATION

CROSS-REFERENCE TO RELATED APPLICATIONS

This application claims priority to U.S. Provisional Application Nos. 62/025,041, filed Jul. 16, 2014 and 62/036,762, filed Aug. 13, 2014, the complete disclosures of which are incorporated herein by reference in their entirety. The disclosure of the present application is also related to the disclosures of U.S. application Ser. No. 14/686,427, filed Apr. 14, 2015; U.S. application Ser. No. 14/695,636, filed Apr. 24, 2015; and U.S. application Ser. No. 14/729,561, filed Jun. 3, 2015, all of which are incorporated herein by reference in their entireties.

BACKGROUND OF THE INVENTION

This application relates generally to the use of augmented reality to provide information and direction to users operating in or manipulating dynamic environments and, more particularly, to the use of augmented reality to present material and status information on a hoisting, rigging, or other lifting/transport process to a user in real time.

Augmented reality (AR) provides a view of a physical, real-world environment whose elements are augmented (or supplemented) by computer-generated sensory input such as sound, text, graphics, or video. In a typical AR application, a data processor reviews a camera-captured image for cues that trigger the display of additional information and images along with a display of the captured image.

While AR is useful for conveying information via a static display, it is particularly useful in dynamic situations and environments where images are captured and displayed in real-time and the information to be displayed using AR (hereinafter, "AR information") changes. The ability to provide constant update to the AR information in response to changes in the environment and location and relative positioning of the user's display provides great utility in various applications including construction, repair, maintenance, and safety.

A particularly significant example of a dynamic spatial environment is the space on board a large ship. Not only does the ship itself move, its structure is flexible so that the position of a particular compartment or supporting structure in one part of the ship may change relative to other parts of the ship. Similar dynamic behavior can occur in tall buildings, construction sites, outdoor processing plants, roadways, bridges, etc.

In shipbuilding, as in the construction industry overall, lifting and handling of components, assemblies, tools, materials, and even personnel is a major part of the construction process. To the layman, it might appear that construction crews, particularly riggers, simply hook up a piece of equipment or a construction assembly to a crane hoist and lift the item into the desired position. For transporting small items weighing only a few hundred pounds or less this might be the case. However, when it comes to lifts weighing in the hundreds to thousands of tons, there are significant factors that must be known and taken into account by the rigging crew. These factors include, but are not limited to such things as crane capacity, crane and load foundation ratings, lift points, center of gravity, mass/weight of the lift, lift dimensions, travel route, cable angle, and particularly for exterior lifts, wind speed, temperature, and visibility. Many of these factors can change significantly during a lift. Moreover, the dynamic environment in which the lift takes place can change.

In accordance with the American Society of Mechanical Engineering (ASME) Codes and Standards, lifts may be categorized as ordinary, critical, or pre-engineered. This categorization determines the type of pre-lift planning that must be done to ensure the safety of workers and equipment involved. Each category requires a different level of planning before the lift is conducted. For most lifts, a written lift plan may be required which may include rigging sketches and/or descriptions. No matter how detailed the plan, however, changes in the load, lift conditions, or the dynamic environment can occur. Clear, rapid communication of such changes to operators and other individuals involved in the lift is essential.

SUMMARY OF THE INVENTION

An illustrative aspect of the invention provides a method for providing information associated with a lift process to a mobile interface device user in a dynamic structural environment. The method comprises receiving on a central data processor from the mobile interface device over a communication network a request for lift environment information. The request includes information usable by the central data processor to determine a pose of the mobile interface device relative to a lift process target area in the dynamic structural environment. The method further comprises determining the pose of the mobile interface device relative to the lift process target area and obtaining lift environment information for at least a portion of the lift process target area. The lift environment information is used to assemble AR lift information for transmission to and display on the mobile interface device. The AR lift information is assembled using the lift environment information and is configured for viewing in conjunction with a real-time view of the lift process target area captured by the mobile interface device. The method also comprises transmitting the AR lift information to the mobile interface device.

Another illustrative aspect of the invention provides an automated system for providing information associated with a lift process to a mobile interface device in a dynamic structural environment. The system comprises at least one mobile interface device configured for variable disposition within the dynamic structural environment, capturing information about a lift process target area within the structural environment, and transmitting the lift process target area information over a network. the system further comprises a local positioning system in communication with the at least one mobile interface device via the network and configured to provide information usable to determine a mobile interface device pose. The mobile interface device pose comprises a position and orientation of the mobile interface device relative to the dynamic structural environment. The system also comprises a central processor comprising at least one data processing machine in communication with the at least one mobile interface device and the local positioning system via the network. The central processor is configured for receiving from a requesting one of the at least one mobile interface device a request for lift environment information for the lift process target area. The request includes information usable to determine a pose of the requesting mobile interface device relative to the lift process target area. The central processor is further configured for determining the pose of the requesting mobile interface device relative to the lift process target area and for obtaining lift environment information for at least a portion of the lift process target area. The central processor is still further configured for assembling AR lift information for transmission to and display on the requesting mobile interface device. The AR lift information is assembled using the lift environment information and is configured for viewing in conjunction with a real-time view of the lift process target area captured by the requesting mobile interface device. The central processor is also configured for transmitting the AR lift information to the requesting mobile interface device.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

The present invention provides methods and systems for real-time display of AR information on a mobile device immersed in and movable within a dynamic environment. The challenges presented by this scenario include determination of the location of and orientation of the mobile device within the environment, recognition of variations in the spatial geometry of the environment, and detection/identification of changes in other measurable parameters associated with the environment or objects within the environment.

While the invention will be described in connection with particular embodiments, it will be understood that the invention is not limited to these embodiments. On the contrary, it is contemplated that various alternatives, modifications and equivalents are included within the spirit and scope of the invention as described.

While the dynamic structural environments used in many of the examples and illustrative embodiments used herein to describe the invention relate to ships and other vessels, it will be understood that the invention is not limited to such environments. The invention can be used in, without limitation, land vehicles, buildings and any other static or dynamically variable structure.

The systems of the invention use AR as the primary medium for presenting environment-related information to a user. AR allows presentation of such information on the mobile interface device in graphical or textual form overlaid or adjacent an environmental area or object as it appears in the camera-generated view on the device screen.

Figure 1:
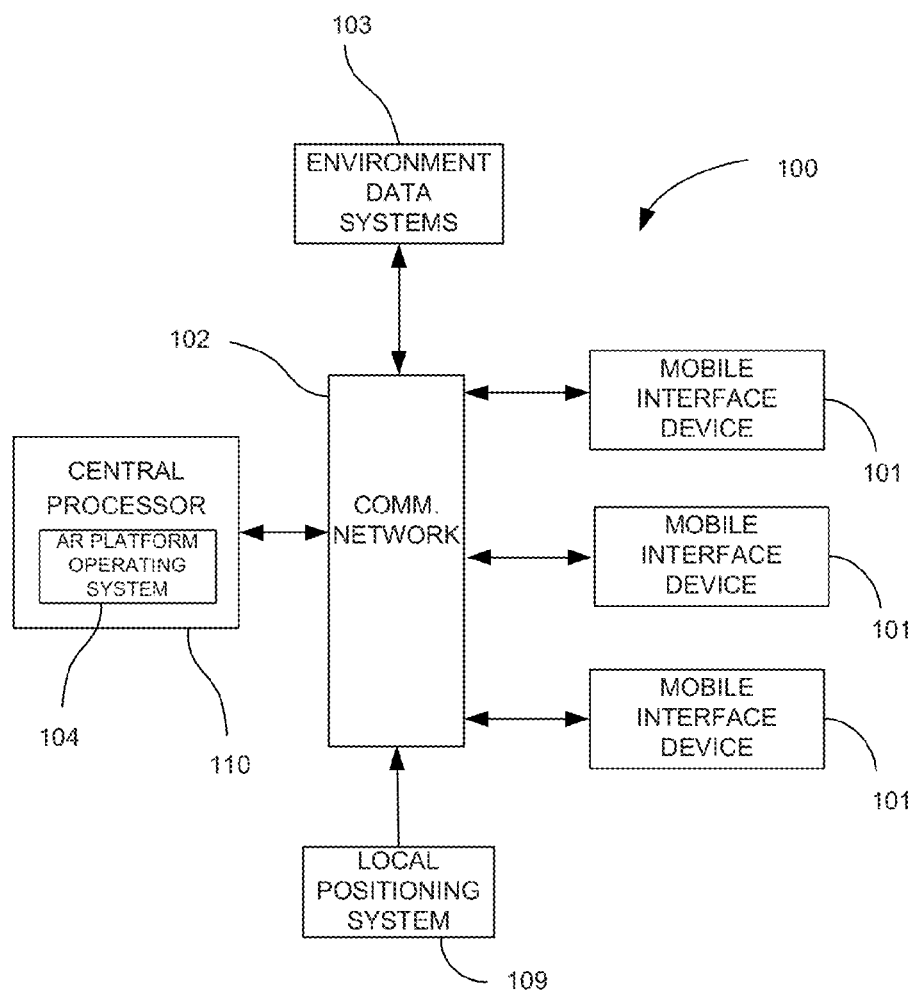
FIG. 1 is a schematic representation of a system for providing environment information to a mobile interface device according to an embodiment of the invention.

A generalized system 100 for generating and displaying real-time AR information according to an embodiment of the invention is illustrated in FIG. 1. The system 100 is configured for obtaining and storing information on a dynamic structural environment such as a ship or building and objects disposed within that environment. The system 100 comprises a central processor 110 in communication with one or more mobile interface devices 101 via a communication network 102. The central processor may include or be in communication with a relational database structure (not shown) as is described in U.S. patent application Ser. No. 14/210,650 (the "'650 Application), filed on Mar. 14, 2014, the complete disclosure of which is incorporated herein by reference in its entirety. In general, the central processor 110 is configured to receive captured object information from the mobile interface devices 101 and to extract information relating to the environment or an object in the environment, generate AR information for display on a requesting mobile interface device, and transmit the AR information to the requesting mobile interface device 101.

The central processor 110 may include or be configured to receive information from a local positioning system 109 via the communications network 102 or a different network. The central processor may be configured to use the information from the local positioning system 109 in conjunction with information from a requesting mobile interface device 101 and known/stored structural information (e.g., a three dimensional model) to determine the pose of the mobile interface device 101 within the environment. As used herein, "pose" means the position (x,y,z) and orientation ($\theta,\varphi,\zeta$) of an object in a particular physical space. The system is configured to resolve spatial differences between the coordinate system established based on the known structural information and the data received from the local positioning system 109 that result from changes in the dynamic structure.

The central processor 110 is also configured to receive information from one or more environment data systems 103 via the network 102 or another network. The environment data system 103 is configured for measurement or determination of parameters associated with the structural environment or an object or objects within the structural environment. As will be discussed in more detail, such parameters may include, but are not limited to spatially mapped or mappable data obtained from sensors (e.g., radiation or temperature sensors) with known locations in the structural environment, spatially mapped or mappable data (e.g., weight distribution or surface topography) associated with a particular object in the environment, and system or device status information (e.g., electrical circuit energization status). The central processor 110 is configured to process this information and use it with the pose information for the requesting mobile interface device 101 to generate AR information that can be transmitted to the mobile interface device 101 for display.

In various embodiments of the invention, information processed by the central processor 110 may include asset location information from a global or local positioning system, visual or graphical information received from the mobile interface devices, observational information from users, and operational or other data from instrumentation systems associated with the environment or particular assets. Any or all of such information can be used by the central processor 110 to update object-related information and/or generate information for display via AR images that can be superimposed on the mobile device user's view of the environment or an object in the environment. The mobile interface devices used in the systems of the invention can make use of AR in a variety of ways that allow the user to conduct inspection, maintenance, repair, and replacement tasks in relation to particular assets. AR can also be used to assist a user in identifying safety hazards, locating objects, or simply navigating within the dynamic environment.

The mobile interface device 101 may be any mobile computing solution that is used by a user to facilitate communication with and display information from the central processor 110. The mobile interface device 101 may be, for example, a tablet computer, a smartphone, or a wearable heads-up display. The mobile interface device 101 may have features including, but not limited to a processor, a display (such as a screen), a vision sensor (such as a camera), a microphone, one or more speakers, and wireless communications capabilities. The mobile interface device 101 may be, in a particular embodiment, a wearable head-mounted device (HMD) such as that described in U.S. application Ser. No. 14/210,730, filed Mar. 14, 2014, the complete disclosure of which is incorporated herein by reference in its entirety. In preferred embodiments, the mobile interface device 101 is equipped or configured to display AR images/information to a user. The mobile interface device 101 may include one or more accelerometers or other motion detection sensors. Each mobile interface device 101 may include one or more unique identifiers. In some embodiments, some or all of the mobile interface devices 101 may include one or more local positioning receivers, image and object recognition, audio queues, or electromagnetic field (EMF) receivers or detectors (for GPS, WiFi, or RFID reception or light detection).

The communication network 102 may be a wireless network, a wired network or any combination of wireless network and wired network. In a preferred embodiment, the communications network 102 is a wireless communications network, allowing the mobile interface devices 101 to communicate wirelessly with the central processor 110. The communication network 102 may, in particular, be or include a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal.

The central processor 110 may be or comprise one or more servers, data processing machines, or network-enabled computers and may host an AR operating system 104. The AR operating system 104 may be configured to control the interaction of the hardware and software components of a relational database structure (not shown). The relational database structure is configured to provide a logical framework that allows digital information to be associated with physical objects. This framework includes addresses for both tangible objects as well as individual point addresses within a coordinate system for the structural environment. In an exemplary embodiment, this coordinate system is based on a three dimensional (3D) structural model of the environment (e.g., the ship or building). Preferably, the 3D model provides a complete detail of the environment including every space, room or compartment where objects may be disposed.

The AR operating system 104 is configured to assemble AR information for transmission to and display by the mobile device 101. The AR information is constructed using the processed environment data from the environment data systems 103 and the pose of the mobile device 101 using any of various techniques known in the art. The AR information may be presented for display as text or as graphical images that can be superimposed over real-time images captured by the mobile device 101. The AR information may be associated with specific parameters relating to the portion of the environment where the mobile device 101 is located or relating to an object or system near the mobile device 101 and/or with which the user of the mobile device 101 is interacting.

The central processor 110 may be configured or may comprise a processor or processing module and computer executable software (e.g., on a tangible computer-readable medium) configured to perform various processing functions relating to object recognition, including feature extraction to extract lines, edges, ridges, or other localized interest points from an image; detection or segmentation to select a specific set of interest points within an image or segment multiple image regions that contain a specific object of interest; image recognition to categorize a detected object into a particular category; noise reduction; contrast enhancement; and/or space scaling, for example.

The relational database structure may include a domain coordinate management system that maintains spatial addresses for all spaces within the domain of the structural environment. The domain coordinate management system may be configured to receive spatial address information from both the local positioning system 109 and from the three dimensional structural model. The domain coordinate management system is configured to resolve spatial differences between the coordinate system established by the 3D model of the structure and any available telemetry data received from the local positioning system 109 as a result of changes in the dynamic structure. Such differences may be particularly significant in, for example, a large vessel underway at sea. Ships (particularly large ships) are not rigid bodies.

The local positioning system 109 is a system (complete or composite) that facilitates the establishment or estimation of the pose of a mobile interface device 101 within the coordinate system described or approximated by the three dimensional model of the structural environment. As is discussed in more detail in U.S. application Ser. No. 14/210,601, filed Mar. 14, 2014 (the "'601 Application"), the complete disclosure of which is incorporated herein by reference in its entirety, pose may be accurately established using vision science-based algorithms. Such algorithms may recognize one or more unique pre-identified visual tracking cues within a physical space.

The local positioning system 109 may be or include any system capable of establishing the position and/or orientation of a mobile interface device relative to a structural environment coordinate system. This coordinate system may be, or may be based on, for example, a predetermined reference system for a ship or other structure. In some embodiments, the local positioning system 109 may comprise a light positioning system that operates by using light points positioned throughout the physical spaces of the vessel. An example of a light positioning system is described in U.S. Pat. No. 8,248,467, the complete disclosure of which is incorporated herein by reference in its entirety. In some embodiments, the local positioning system 109 may use electromagnetic or sound waves emanating from various points within the physical spaces in the structural environment. Examples of electromagnetic or sound waves include radio frequency identification (RFID) signals, radio signals, WiFi signals, audio tones, and/or sound waves. The local positioning system 109 may use unique images or recognizable visual features, quick response (QR) codes, bar codes, or reference points placed throughout the physical space of the structure.

The system 100 may use information from more than one local positioning system. Alternatively or in addition, the system 100 may receive and use information from a global positioning system (GPS) (not shown).

It will be understood that various processing components of the system 100 may be combined into a single processor or further subdivided into multiple processors or servers. It will be appreciated that in some cases, multiple instances of a particular component of the system 100 may be used. Moreover, the system 100 may include other devices not depicted in FIG. 1.

Figure 2:
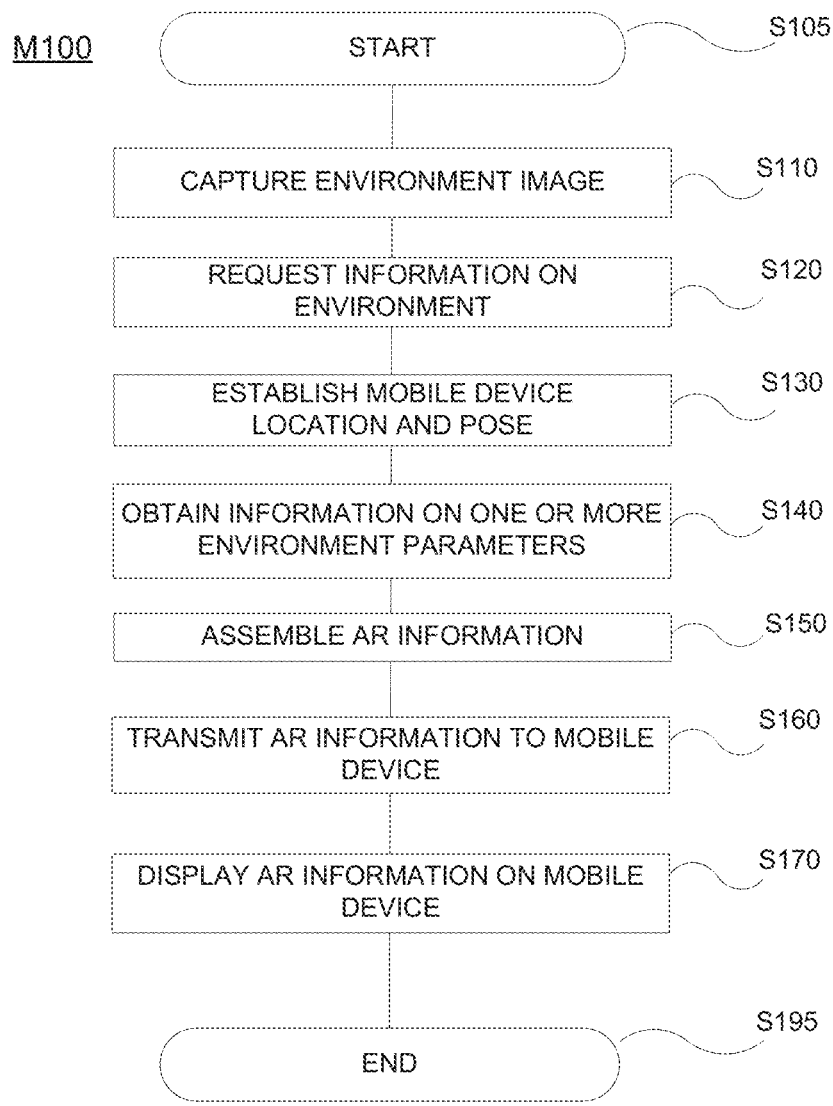
FIG. 2 is a flow diagram of a method of providing environment information to a mobile interface device in a dynamic structural environment according to an embodiment of the invention.

The system 100 can be used to provide mobile device users with real-time AR information on changing environmental parameters or object characteristics. With reference to FIG. 2, a generalized method M100 for providing such AR information to a mobile device user begins at S105. At S110, the user uses the mobile interface device 101 to capture a digital image of a target environment, which may be a portion of the environment in which the user is disposed and/or a target object in that environment. At S120, a request for target environment information is sent from the mobile interface device to a central processor 110 over a network 102. The request includes information usable by the central processor to determine the exact location and pose of the mobile interface device 101 relative to the target environment. This information may include some or all of the digital image. At S130, the central processor 110 uses the request information along with information from the local positioning system 109 to establish the exact location and pose of the mobile device 101 relative to the target environment. In some embodiments, the pose of the mobile device 101 may be determined by the mobile device 101 itself. In such embodiments, pose information may be transmitted by the mobile device 101 to the central processor 110.

At S140, the central processor 110 obtains environment information on one or more environment or target object-related parameters from one or more environment data systems 103. Such information may be raw data from sensors located in areas near the mobile interface device 101 or on or associated with the target object. The information may also be or include information on the status of a system with which the mobile device user may be required to interact. It will be understood that the information from the environment data systems 103 may be provided to the central processor 110 on a constant basis or may instead be provided in response to a request or query submitted by the central processor 110. The central processor 110 may also obtain previously stored information associated with the target object from a data storage module. Environment information may also be received from the mobile device 101 and/or the mobile device user.

It will be understood that as part of or in addition to the action of obtaining environment information, the central processor may be required to process the information received from the mobile interface device 101 to specifically identify the target object and differentiate it from other objects in the environment. In some embodiments, this may be accomplished using object recognition techniques in conjunction with environment location information. In other embodiments, this may be accomplished through the use of unique identifiers or other indicia applied to or attached to the target object. Such indicia can be provided to the central processor 110 by the user or can be extracted from a captured digital image. Among other things, identification of the target object allows the central processor 110 to determine if previously stored information is available for that target object.

In some embodiments. target object parameter information may include information on a particular characteristic or status that can be evaluated to determine if an operation on the target object should be performed, continued or altered by the mobile device user. In some cases, if it is determined that a maintenance or corrective operation is required or if it is already known that such an operation is required, the target object information may be information required by the mobile device user to perform the required operation or change.

In some embodiments, the central processor 110 may be configured to determine the deviation of a current target object status or characteristic from a desired target object status or characteristic. This could, for example, be a deviation of measured performance or geometric parameters from what is specified for the target object. The central processor 110 may use this information to construct the AR information. In an exemplary embodiment, the AR information could include an AR image that visually shows the deviation in conjunction with a real-time view of the target object. In some embodiments, the AR information could be or include a visual representation of the desired target object condition to assist the mobile device user in conducting an operation intended to bring the target object in conformance with that desired condition.

At S150, the central processor 110 uses the environment information to assemble AR information for transmission to the mobile interface device 101. This action may include processing of raw data from the environment data systems into a form usable by the AR operating system 104 to construct the AR information. In some embodiments, the AR information includes a graphical representation of target environment parameters as a visual display that can be superimposed over a real-time view of the target environment captured by the mobile interface device 101. At S160, the central processor 110 transmits the AR information to the mobile interface device 101 where it is displayed to the mobile device user at S170. The method ends at S195.

As previously discussed, the AR information may be presented as text displayable in conjunction with the visual display of the environment or target object or as graphical imagery that can be superimposed over an appropriate portion of the visual display. The graphical imagery could, for example, be or include one or more graphical representations of the parameters measured by the environmental data systems, a condition of the environment associated with such parameters, or the above-described deviation from desired characteristics. It can also be a representation of a target object parameter calculated using information from an environmental data system.

It will be understood that, once requested, some or all of the actions of the method M100 may be repeated to periodically or continuously provide real-time environment information to the mobile interface device 101. This assures that the user is aware of variations due to changes in conditions including but not limited to: the user's location, the overall structural environment, the measured environment parameters, or combinations of the foregoing. In some embodiments, the actions of obtaining target parameter data, assembling AR information and transmitting the AR information may be repeated after some or all of an operation on the target object has been accomplished. This allows the operator to monitor the effect of the operation being conducted on the object.

The methods of the invention are usable by individuals conducting virtually any operation within a dynamic environment. Of particular interest are uses in which real-time display of immediately recognizable cues are required to effect an on-going operation and/or to increase the safety of individuals involved in the operation.

As discussed above, real-time communication is critical to the processes associated with heavy lift operations in both static and dynamic environments. Toward that end, the present invention provides systems and methods for presenting hoisting and rigging plan and status information to a user in real-time using AR. The invention provides the user (e.g., a designated leader or person-in-charge) with all the information in a predetermined lift plan to eliminate the need for hardcopy plans or drawings. The invention also provides real-time information on changes in the environment of the lift and/or load parameters during the lift.

It will be understood that while the invention is presented herein with reference to its use in shipboard applications, it may be applied to any lift or load transport system used in any land, sea, or air environment, whether fixed or mobile.

Figure 3:
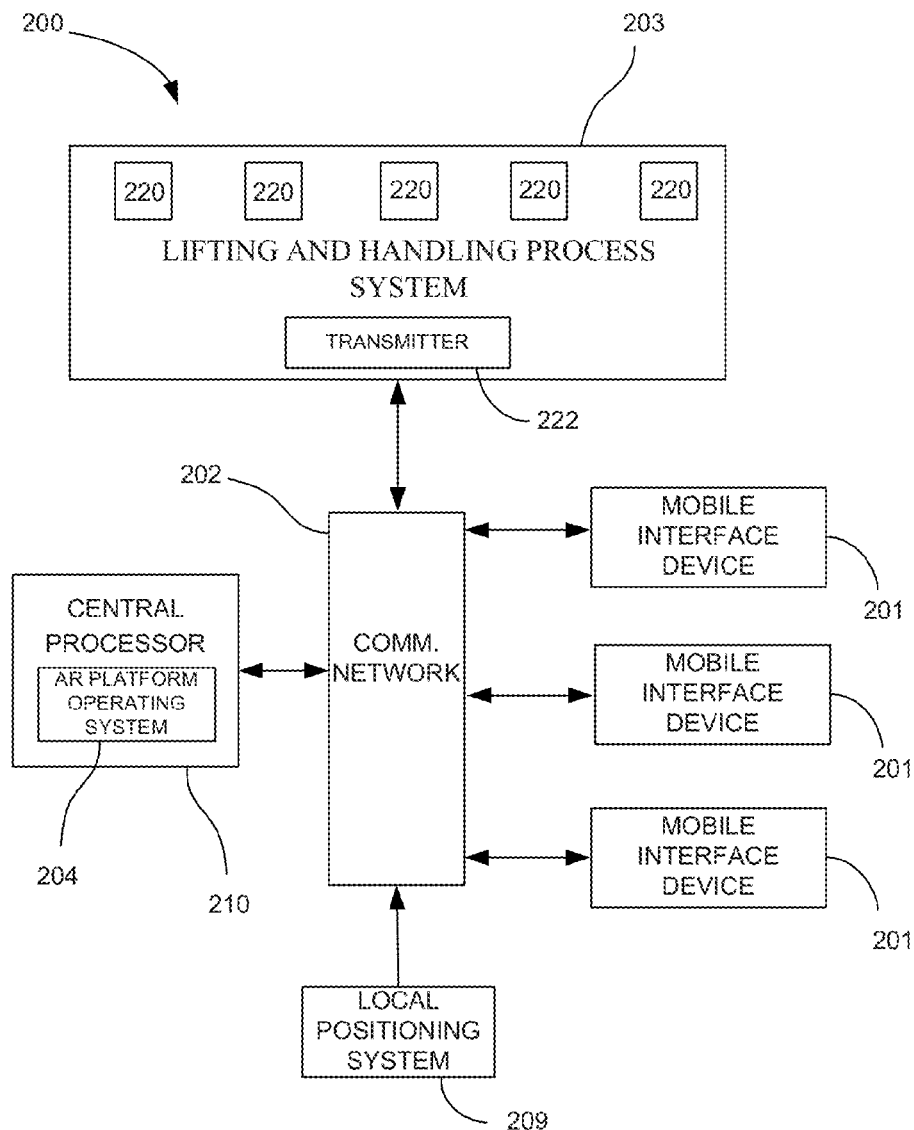
FIG. 3 is a schematic representation of a system for providing lift environment information to a mobile interface device according to an embodiment of the invention.

FIG. 3 illustrates a system 200 for providing lift process information according to an embodiment of the invention. The system 200 is essentially a specific variation of the generalized AR environment display system 100 of FIG. 1. It is noted that system 200 illustrates only a single instance of each component. It will be appreciated that multiple instances of these components may be used and that the system 200 may include other devices not shown in FIG. 3. It will be understood that in many environments, the system 200 will interface with other systems such as, for example, the operating system of a shipboard operations and maintenance platform as described in the '650 Application.

The system 200 comprises a central processor 210 in communication with one or more mobile interface devices 201 via a communication network 202. The mobile interface device 201 may be any mobile computing solution that is integratable into the system. The mobile interface device 201 may be, for example, a tablet computer, a smartphone, or a wearable heads-up display. The central processor 210 may include or be in communication with a relational database structure (not shown) as described in the "'650 Application. The central processor 210 may be configured to receive information from a local positioning system 209 via the communications network 202 or via a different network.

The central processor 210 is also configured to receive lift environment information via the network 202 (or another network) from a lifting and handling process system lifting and handling process system 203. The lifting and handling process system 203 may be in communication with the central processor 210 and/or the mobile interface device 201 via the network 202. The lifting and handling process system 203 may include one or more sensors 220 located on the lift item or incorporated into the lift rigging for measuring object parameters discretely or continuously. The sensors 220 may be or include any of various devices for measuring the lift item location and orientation relative to the mobile interface device. Sensors 220 may also include mechanical limit switches, inductive sensors, balancers, load cells or other devices for measuring loads in various rigging components. In some embodiments, the sensors 220 could include environmental measuring devices such as an ultrasonic (or other type) anemometer to measure wind speed.

The lifting and handling process system 203 may be configured for determining, retrieving, or assembling information needed to construct a three dimensional model and/or graphic representation of the lift item. After establishing the three dimensional representation of the lift item, the lifting and handling process system 203 may transmit hoisting and rigging data directly to one or more mobile interface devices 201 in real time or near real-time over the network 202. Alternatively, information from the lifting and handling process system 203 may be transmitted to the central processor 210 for further processing and/or retransmission to the mobile interface device 201. The lifting and handling process system 203 may communicate directly with one or more mobile interface devices 201 by transmitting status in real time or near real-time over the communication network 202. Data assurance may be addressed by utilizing a data validation process to assure that data provided by the lifting and handling process system 203 is the most current. Data may be checked for accuracy by comparing values from redundant sources (e.g., automated comparison of data from redundant sensor devices 220).

The lifting and handling process system 203 may provide status information automatically continuously or at regular intervals or manually upon command. The system 203 may include a data processing machine (not shown) for processing the sensor data prior to transmission to the central processor 210 or mobile devices 201 or may provide unprocessed data. In each case, sensor data may be associated with the location of the monitoring device 220 within the lift environment to allow the system 200 to establish the status in areas of interest relative to the location of any particular mobile interface device 201. The lifting and handling process system 203 may be configured with a transmitter 222 to transmit information to the central processor 210 or the mobile devices 201 over the communications network 202.

As will also be discussed, a worker using a mobile interface device 201 may be provided with a 3-dimensional representation of lift object and environment information superimposed over a real-time camera view of the lift object and equipment using augmented reality display techniques. This 3-dimensional augmented image is provided to a worker in the correct pose, thus allowing the worker to verify that all aspects of the equipment and process are correct and according to the lift plan. The image can also provide graphical images allowing him to visualize in real-time or near real time the current status of measured and calculated environment and object parameters.

Figure 4:
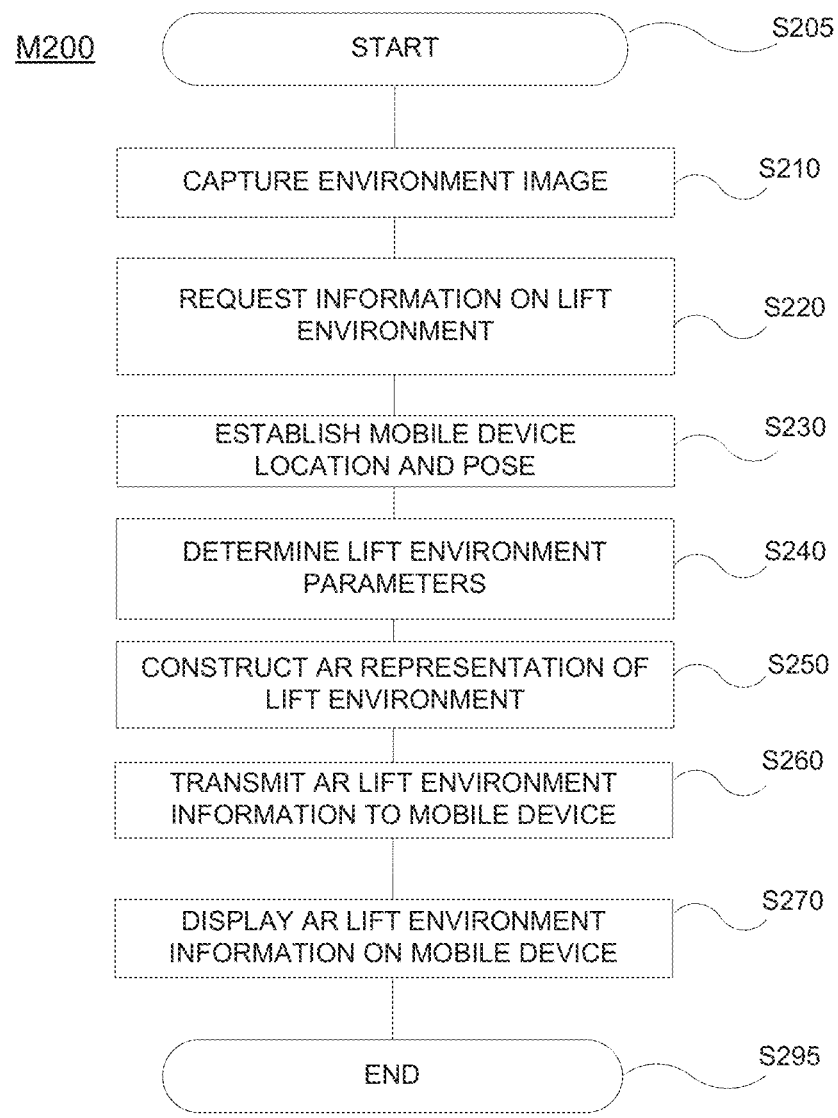
FIG. 4 is a flow diagram of a method of providing lift environment information to a mobile interface device in a dynamic structural environment according to an embodiment of the invention.
Figure 5:
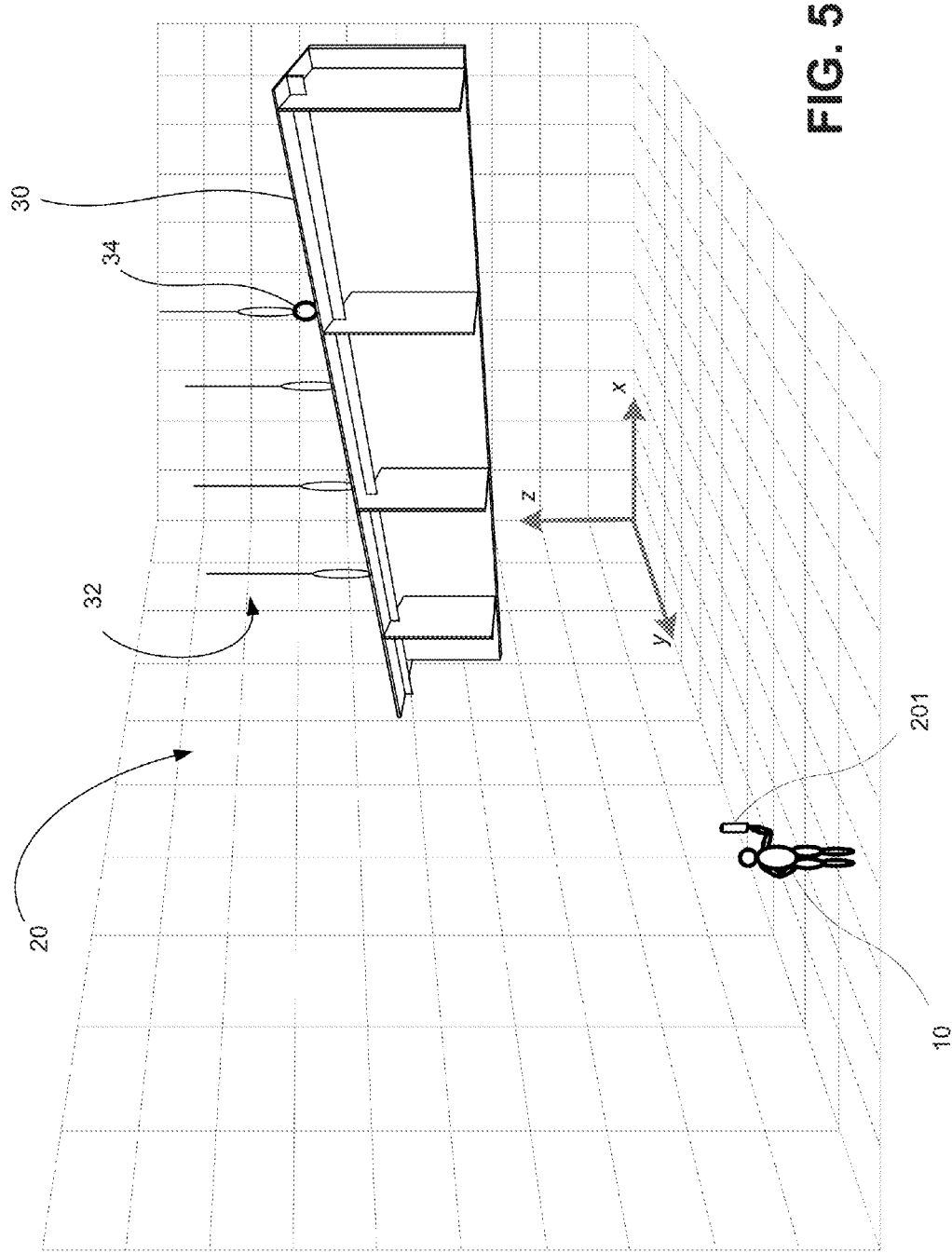
FIG. 5 is an illustration of a mobile interface device user in a lift environment area having a lifted load disposed therein.

With reference to FIGS. 4 and 5, a method M200 may be conducted using the lift process information display 200 to provide lift environment information to a mobile device user 10. The method begins at S205. At S210, the user uses the mobile interface device 201 to capture a digital image of a portion 20 of an environment in which a lift operation with a load 30 is to take place or is taking place (referred to herein as the target environment or target area). In the exemplary lift operation illustrated in FIG. 5, the load 30 is a highly irregular shaped load that is being lifted using multiple rigging lines 32 attached to the load 30 such as by the lift ring 34. At S220, a request for lift environment information is sent from the mobile interface device 201 to a central processor 210 over a network 202. The request includes information usable by the central processor 210 to determine the exact location and pose of the mobile interface device 201 with respect to the target area and/or the load 30. The space could be, for example, a room or other space inside a vessel or building or an exterior area such as deck, building roof, or the ground adjacent a structure. The information sent from the mobile interface device 201 may include some or all of the captured digital image. At S230, the central processor 210 uses the request information along with information from the local positioning system 209 to establish the exact location and pose of the mobile interface device 201 relative to the target area 20.

At S240, status information associated with load, rigging and/or other environment parameters within the target area 20 is obtained. The information may be obtained from a lift plan and/or from a lifting and handling process system. The information may include the spatial location of the lift item within the established coordinate system based on sensor measurements. The information may also include weight distribution and/or center of gravity information based on predetermined or real-time measurements. The information may also include environmental parameters that could affect the lift such as ambient temperature and wind speed. The information may be obtained during or prior to the target area visualization process. At S250, the lift environment information may be used as inputs to a computational component or simulation engine that will output the status of particular environment parameters. The simulation engine may use simulation-based computational engineering and visualization software. If computation is not necessary (e.g., when status information can be displayed directly), S250 is not required.

It will be understood that the action of determining lift environment parameters may be conducted by a processor of the lifting and handling process system 203 or the central processor 210 or may be conducted in part by a processor of the lifting and handling process system 203 and in part by the central processor 210.

In preferred embodiments, lift environment information is available in real time so that actual live parameter levels can be provided to the mobile device user 10. In some instances, however, such live readings may be unavailable. In such instances, the parameter status may be based on previous information such as may be provided in the lift plan.

In some embodiments of the invention, a worker using a mobile interface device may be provided with a 3-dimensional AR image of the proposed hoisting and rigging plan. This image may be provided, in the correct pose, as an overlay over a real-time or near real-time camera-view of the as-rigged lift item design. This allows the worker to visualize in real-time or near real time the location of various lift parameters without the need to make field measurements. The systems of the invention can also provide calculations or visual representations of discrepancies between a planned lift parameter and the actual measured parameter. The system may also provide the worker with specified operating procedures and special instructions for safely rigging and hoisting the lift item as per the pre-lift plan.

At S260 a rendering engine on the central processor 210 uses data received (discretely or continuously) from the simulation engine or directly from the lifting and handling process system 203 along with mobile device pose information to construct an AR representation of the lift environment in the target area 20. In preferred embodiments, this includes graphically rendering a visual display that can be superimposed over the view of the target area 20 captured by the mobile interface device 201. This rendering could include, for example, textual/numerical information or graphical information positioned so as to be readily associable with a component or node appearing in the captured view of the target area. The displayed information may include specific parameter values for system components in the viewed target area. It may also include component or test identification information or task instructions for the user 10. In some cases, the user may be presented with instructional training scenarios including an augmented representation of test points and graphical steps to follow when conducting a particular operation. At S270, AR lift information, which is or includes the AR graphical rendering constructed in S260, is transmitted to the mobile interface device 201. At S280, some or all of the AR electrical status information is displayed on the mobile interface device 201. The method M200 ends at S295.

Figure 6:
FIG. 6 is an illustration of an exemplary display of an image of a lift environment on a mobile interface device in accordance with an embodiment of the invention.

In preferred embodiments, when the graphical AR rendering of the lift information is displayed on the mobile device 201, it is superimposed over the displayed image of the target area 20 so that the user 10 is able to see the status information for system components throughout the target area 20 or in specific portions of the target area 20. FIG. 6 illustrates the device 201 of FIG. 5 displaying a real-time target area image 20' that includes the load 30' and lift lines 32'. It also includes AR lift information superimposed over the camera image. In the illustrated example, the AR lift information includes textual load information 40' including load identification and dimension and weight data. The AR lift information also includes a graphical representation of the load's center of gravity 42. As previously discussed, any of this information can be updated based on real-time or near-real-time measurements. In some embodiments different aspects of the information may be displayed in different colors or may change color when its status changes.

It will be understood that, once requested, some or all of the actions of the method M200 may be repeated to periodically or continuously provide real-time environment information to the mobile interface device 201. This assures that the user 10 is aware of variations in the environment due to changes in conditions including but not limited to: the user's location, the overall dynamic structural environment, changes occurring in the load's weight distribution or other measured parameters, or combinations of the foregoing.

In embodiments of the present invention, once a lift category has been determined and the hoisting and rigging plan has been completed, a worker may use a mobile interface device to visualize the necessary information required to perform any lift safely. Using the invention, the worker may be provided with a visual representation of the characteristics of the item to be lifted including, but not limited to weight, dimensions in at least three directions, the lift item's center of gravity, appropriate lift points and other intrinsic characteristics. In addition, the worker may also receive visual representation of information identifying the operating equipment and its rated capacity to verify that the equipment being used is according to the lift plan. The methods of the invention may also provide workers with a visualization of rigging sketches overlaid on a camera view of the equipment to guide the rigging process or to verify that the rigging is configured per the lift plan. The visualization and/or description may include, but is not limited to identification and rated capacity of slings, lifting bars, rigging accessories and any below-the-hook devices used. A worker may also be provided with operating procedures and special instructions including rigging precautions and safety measures to be followed.

While the examples presented herein relate to component and assembly lifting, the methods of the invention may be extended to any type of heavy lift that allows a worker to visualize the key lift parameters or see a graphical representation of what is expected or required by the hoisting and rigging plan overlaid on the as-rigged lift item. The as-rigged configuration may be compared to a 3D model, or other representation of the intended lift plan, for example, and the resulting information may be visually provided to a worker through augmented reality in real time so that corrections may be made prior to beginning the hoisting process.

The present invention may utilize any of the aforementioned or other methods available for providing lift environment information to workers participating in a lift operation. There are no known methods which provide workers with a visualized real-time situational awareness of such dynamic operations.

As has been discussed, while the systems and methods of the present invention have a particular value when applied to vessels and other mobile structures, they may also be applied to stationary buildings and other structures as well. In stationary environments, GPS and GIS information are typically available and may be used by the operating system. The invention is, however, of particular utility in shipboard or other mobile/dynamic environments in which GPS information may be unreliable or unavailable. As has also been discussed, the present invention also addresses the problem of dynamic changes in structure and relative positioning such as are often encountered in large vessels. It will be understood that in some embodiments, the invention may be usable in a setting in which the user is not inside a structure and that the term "structural environment" may encompass exterior structural settings.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method for providing information associated with a lift process to a mobile interface device user in a dynamic structural environment in the form of a dynamic structure having an associated environment coordinate system, the method comprising:
   receiving on a central data processor from the mobile interface device over a communication network a request for lift environment information, the request including request information usable by the central data processor to determine a pose of the mobile interface device relative to a lift process target area in the dynamic structural environment;
   receiving mobile interface device location information from a local positioning system of the dynamic structure, said location information being provided using the environment coordinate system;
   determining the pose of the mobile interface device relative to the lift process target area using the request information and the mobile interface device location information;
   obtaining lift environment information for at least a portion of the lift process target area;
   assembling augmented reality (AR) lift information for transmission to and display on the mobile interface device, the AR lift information being assembled using the lift environment information and being configured for viewing in conjunction with a real-time view of the lift process target area captured by the mobile interface device; and
   transmitting the AR lift information to the mobile interface device,
   wherein the action of determining the pose of the mobile interface device accounts for spatial changes in the environment coordinate system in the lift process target area due to changes in the dynamic structural environment.

2. A method according to claim 1, wherein the mobile interface device is one of the set consisting of a tablet computer, a smartphone, and a wearable heads-up display.

3. A method according to claim 1 wherein the request for lift environment information includes a digital image of the target area captured by the mobile interface device.

4. A method according to claim 3 wherein a load to be lifted is disposed within the lift process target area, at least a portion of the load being viewable in the digital image and wherein the action of obtaining target environment data includes:
   receiving load parameter information from one or more monitoring devices associated with the load.

5. A method according to claim 4 wherein the AR lift information includes the load parameter information and is configured so that when viewed in conjunction with the real-time view of the lift process target area captured by the mobile interface device, the load parameter information is displayed adjacent the at least a portion of the load in the captured real-time view.

6. A method according to claim 4 wherein the load parameter information includes at least one of the set consisting of a position of at least one point on the load relative to the lift process target area, an orientation of the load relative to the lift process target area, a load weight, a load mass distribution, and a location of a center of gravity of the load.

7. A method according to claim 4 wherein the action of obtaining target environment data further includes:
   measuring a tensile force on a line from which the load is suspended.

8. A method according to claim 4 wherein the action of assembling AR target object information includes:
   comparing a measured load parameter to a predetermined expected parameter to determine a load parameter deviation.

9. A method according to claim 8 wherein the AR lift information includes a graphical representation of the load parameter deviation that can be superimposed over the real-time view of the lift process target area captured by the mobile interface device.

10. A method according to claim 1 wherein the actions of determining, obtaining, assembling and transmitting are periodically repeated.

11. A method according to claim 1 wherein the action of determining a pose of the mobile interface device comprises:
   identifying spatial differences between a current conformation of the dynamic structure and a modeled conformation of the dynamic structure, the spatial difference resulting from the changes in the dynamic structural environment; and
   applying the spatial differences in the environment coordinate system to establish the pose of the mobile interface device relative to the lift process target area.

12. A method according to claim 1 wherein the dynamic structure defines an interior space in which the lift process target area is disposed.

13. A method according to claim 1 wherein the spatial changes result from flexure of the dynamic structure.

14. An automated system for providing information associated with a lift process to a mobile interface device in a dynamic structural environment in the form of a dynamic structure having an environment coordinate system, the system comprising:
- at least one mobile interface device configured for variable disposition within the dynamic structural environment, capturing information about a lift process target area within the structural environment, and transmitting the lift process target area information over a network;
- a domain coordinate management system comprising one or more data processors configured for receiving information on a current conformation of the dynamic structural environment and resolving spatial differences in the environment coordinate system between the current conformation of the dynamic structural environment and a stored model of the dynamic structural environment;
- a local positioning system disposed at least partially within the dynamic structure, the local positioning system being in communication with the at least one mobile interface device and the domain coordinate system via the network and being configured to provide location information usable to determine a mobile interface device pose, said mobile interface device pose comprising a position and orientation of the mobile interface device relative to the lift process target area in the environment coordinate system; and
- a central processor comprising at least one data processing machine in communication with the at least one mobile interface device, the domain coordinate management system, and the local positioning system via the network, the central processor being configured for
  - receiving from a requesting one of the at least one mobile interface device a request for lift environment information for the lift process target area, the request including information usable to determine a pose of the requesting mobile interface device relative to the lift process target area,
  - determining the pose of the requesting mobile interface device relative to the lift process target area accounting for spatial changes in the environment coordinate system in the lift process target area due to changes in the dynamic structural environment,
  - obtaining lift environment information for at least a portion of the lift process target area,
  - assembling augmented reality (AR) lift information for transmission to and display on the requesting mobile interface device, the AR lift information being assembled using the lift environment information and being configured for viewing in conjunction with a real-time view of the lift process target area captured by the requesting mobile interface device, and
  - transmitting the AR lift information to the requesting mobile interface device.

15. A system according to claim 14 further comprising:
at least one lifting and handling processing system comprising one or more monitoring devices associated with a load at least partially disposed within the lift process target area, the monitoring devices being configured for determining a load environment parameter.

16. A system according to claim 15 wherein the one or more monitoring devices includes means for determining a position of a point on the load.

17. A system according to claim 15 wherein the one or more monitoring devices includes at least one load cell for configured and positioned for measuring a load on a member supporting the load.

18. A method according to claim 14 wherein the spatial changes result from flexure of the dynamic structure.

* * * * *